United States Patent
Matsuoka (10) Patent No.: US 7,522,238 B2
(45) Date of Patent: Apr. 21, 2009

(54) LAMINATE POLARIZING PLATE, A METHOD OF PRODUCING THE SAME AND A LIQUID CRYSTAL DISPLAY

(75) Inventor: Yoshiki Matsuoka, Niihama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 352 days.

(21) Appl. No.: 11/113,296

(22) Filed: Apr. 25, 2005

(65) Prior Publication Data

US 2005/0243252 A1 Nov. 3, 2005

(30) Foreign Application Priority Data

Apr. 26, 2004 (JP) .............................. 2004-129506

(51) Int. Cl.
G02F 1/1335 (2006.01)

(52) U.S. Cl. .......................... 349/117; 349/96; 349/118

(58) Field of Classification Search ................... 349/96, 349/117, 118, 122
See application file for complete search history.

(56) References Cited

U.S. PATENT DOCUMENTS

| | | | |
|---|---|---|---|
| 5,196,953 A | 3/1993 | Yeh et al. | |
| 5,516,456 A | 5/1996 | Shinohara et al. | |
| 5,568,290 A | 10/1996 | Nakamura | |
| 5,793,455 A | 8/1998 | Nakamura | |
| 6,060,183 A | 5/2000 | Higashi et al. | |
| 6,738,120 B1 | 5/2004 | Song et al. | |
| 6,890,608 B2 * | 5/2005 | Morishima et al. | 428/1.3 |
| 2004/0207790 A1 | 10/2004 | Song et al. | |
| 2005/0243259 A1 | 11/2005 | Song et al. | |
| 2007/0081116 A1 | 4/2007 | Song et al. | |

FOREIGN PATENT DOCUMENTS

| | | |
|---|---|---|
| EP | 1 174 736 A1 | 1/2002 |
| JP | 5-53016 A | 3/1993 |
| JP | 5-249457 A | 9/1993 |
| JP | 7-191217 A | 7/1995 |
| JP | 7-287123 A | 10/1995 |
| JP | 8-43812 A | 2/1996 |
| JP | 2548979 B2 | 8/1996 |
| JP | 10-104428 A | 4/1998 |
| JP | 11-95030 A | 4/1999 |
| JP | 2000-284122 A | 10/2000 |
| JP | 2001-109009 A | 4/2001 |
| WO | WO 94/24191 A1 | 10/1994 |
| WO | WO 96/11967 A1 | 4/1996 |

* cited by examiner

*Primary Examiner*—Thoi V Duong
(74) *Attorney, Agent, or Firm*—Sughrue Mion, PLLC (57) ABSTRACT

The object of the present invention is to provide a laminate polarizing plate of which application to liquid crystal displays is able to simplify constitutions and production procedures of the displays, and to reduce cost thereof; and to provide an industrially advantageous method of producing the compound polarizing plate, and a liquid crystal display using the same. The object is achieved by a laminate polarizing plate comprising a polarizing film, an adhesive layer and a phase retarder film which being laminated in this order, wherein said phase retarder film comprises at least one coating layer having refractive index anisotropy of which an in-plane retardation value ($R_0$) is 0 to 10 nm and a retardation value in the thickness direction (R') is 40 to 300 nm, wherein said coating layer is formed on a transfer substrate, followed by being transferred on a surface of the adhesive layer of the polarizing film.

5 Claims, 6 Drawing Sheets

LAMINATE POLARIZING PLATE, A METHOD OF PRODUCING THE SAME AND A LIQUID CRYSTAL DISPLAY

BACKGROUND OF THE INVENTION

1. Field of the Invention

The present invention relates a laminate polarizing plate effective to improve viewing angle characteristics of liquid crystal displays, a method of producing the same and a liquid crystal display comprising the same.

2. Description of the Related Art

Liquid crystal displays which have characteristics of low power consumption, low drive voltage, light weight and flat panel, rapidly spread to devices displaying information such as cellular phones, handheld terminals, monitors for computer and televisions. On account of development of liquid crystal cell technologies, liquid crystal displays having various modes are proposed and it is getting to solve the problems of liquid crystal display relating response speed, contrast and narrow viewing angle. The liquid crystal displays, however, are still pointed out on the problem of their narrower viewing angle compared with cathode ray tubes (CRT); hence, various attempts have been done to expand their viewing angle.

As one of liquid crystal displaying methods to improve the viewing angle, for example, Japanese Patent No. 2548979 discloses a vertical-alignment mode nematic type liquid crystal display (VA-LCD). The vertical-alignment mode passes light through liquid crystal layer without changing polarization thereof due to liquid crystal molecules being aligned vertically against substrate in non-driving state. Therefore, by placing linear polarizing plates on and under a liquid crystal panel in a manner of their polarization axes being orthogonal each other, it is achieved to obtain almost complete black indication giving high contrast ratio when being viewed from front side.

However, the vertical-alignment mode liquid crystal displays equipping only polarizing plates to a crystal cell, when viewed from inclined directions, remarkably decreases contrast by light leakage due to deviation of viewing angle to the equipped polarizing plates from 90°, and generating birefringence on rod-like liquid crystal molecules in the cell.

To depress this light leakage, it is necessary to dispose optical compensation films between a liquid crystal cell and linear polarizing plates; for this purpose, conventionally applied methods include the method that each one of biaxially phase retarder films being independently disposed between a liquid crystal cell and, respective upper and lower polarizing plates; the method that each one of an uniaxially phase retarder film and a completely biaxially phase retarder film being independently disposed respectively on and under a liquid crystal cell; or the method that both of an uniaxially phase retarder film and a completely biaxially phase retarder film being co-disposed at one side of a liquid crystal cell. JP-A No. 2001-109009 discloses that, in a vertical-alignment mode liquid crystal display, each of an a-plate (positive uniaxially phase retarder film) and a c-plate (completely biaxially phase retarder film) is independently disposed between a liquid crystal cell, and respective upper and lower polarizing plates.

The positive uniaxially phase retarder film is a film of which ratio $R_0/R'$ of an in-plane retardation value ($R_0$) to a retardation value in a thickness direction ($R'$) is approximately 2; and the completely biaxially phase retarder film is a film of which in-plane retardation value ($R_0$) is nearly zero. When letting $n_x$ to the refractive index of in-plane slow axis of film, $n_y$ to the refractive index of in-plane fast axis of film, $n_z$ to the refractive index in thickness direction, and d to the film thickness, the in-plane retardation value $R_0$ and the retardation value in a thickness direction $R'$ are respectively defined by the following formula (I) and (II).

$$R_0 = (n_x - n_y) \times d \qquad (I)$$

$$R' = [((n_x + n_y)/2 - n_z] \times d \qquad (II)$$

Due to $n_z \approx n_y$ in a positive uniaxially phase retarder film, it results $R_0/R' \approx 2$. Even in an uniaxially phase retarder film, $R_0/R'$ varies in a range approximately 1.8 to 2.2 due to fluctuation of film elongation conditions. Due to $n_x \approx n_y$ in a completely biaxially phase retarder film, it results $R_0 \approx 0$. Since the completely biaxially phase retarder film is a film of which refractive index is different (or smaller) only in a thickness direction, it has a negative uniaxially phase retardation, and is alternatively called a film having an optical axis in normal line or, as aforementioned, a c-plate. The biaxially phase retarder film attains $n_x > n_y > n_z$.

Above described methods such that each of a biaxially phase retarder film being independently disposed between a liquid crystal cell and, respective upper and lower polarizing plates, each of an uniaxially phase retarder film and a completely biaxially phase retarder film being independently disposed respectively on and under a liquid crystal cell, or both of an uniaxially phase retarder film and a completely biaxially phase retarder film being co-disposed at one side of a liquid crystal cell, are performed by a complex production procedures or economically disadvantaged.

The polarizing plate is conventionally used in a form of a laminate of a protection layer on one or both sides of the polarizer, and a triacetylcellulose film is generally used as the protection layer; many attempts have been tried to replace the protection layer with other resins or to give a phase retardation properties to the protection layer. For example, JP-A No.H08-43812 discloses that at least one of protection layers of a polarizer is constituted by a birefringent film. As another example, JP-A No.H07-287123 discloses that the protection layer of a polarizer is constituted by norbornene resins (cyclic olefin resins).

As alternation, it is known that a layer exhibiting refractive index anisotropy is formed by coating some kinds of solutions or dispersions. For example, JP-A No.H07-191217 discloses that a coating solution dissolving a discotic liquid crystal in an organic solvent is coated on a transparent support film, followed by aslant aligning and then fixing the liquid crystal to obtain an optically anisotropic element, and the optically anisotropic element is disposed at least one side of a polarizer to form an elliptic polarizing plate. (corresponding to U.S. Pat. No. 6,060,183 JP-A No.H10-104428) discloses that a phase retarder film is formed by a layer containing an organic modified clay composite able to disperse in an organic solvent. WO94/24191 (corresponding to JP-A No.H08-511812) discloses that a polyimide film prepared from a soluble polyimide solution is used as a negative birefringent anisotropic layer for liquid crystal display devices. WO96/11967 (corresponding to JP-A No.H10-508048) discloses that a negative birefringent film prepared from a rigid chain polymer comprising polymers exhibiting a negative birefringent anisotropy such as a polyamide, a polyester, a poly(amide-imide) or a poly(ester-imide) is applied to liquid crystal displays. Moreover, (corresponding to U.S. Pat. No. 5,196,953 JP-A No.H05-249457) discloses that a multi-layered thin film alternately laminated with materials having different refractive index is used as an optical compensation layer for liquid crystal displays.

SUMMARY OF THE INVENTION

The inventors of the present invention have been diligently researched to develop a laminate polarizing plate which will achieve simplified constitution, simplified production procedures and cost reduction with retaining equal to or more than optical characteristics exhibited by vertical-alignment mode liquid crystal displays described above in which each one of biaxially phase retarder films being independently disposed at upper and at lower side; and to apply it to vertical-alignment mode liquid crystal displays to obtain well viewing angle characteristics. Consequently, the inventors have found that a laminate polarizing plate laminating a phase retarder film including a coating layer on a polarizing film, is simplified in its constitution and has an excellent viewing angle combined with simplicity when being employed to liquid crystal displays; further found that liquid crystal displays having an excellent viewing angle combined with simplicity, can be obtained by disposing the laminate polarizing plate on one side of a liquid crystal cell and a second polarizing film on the other side of the liquid crystal cell along with disposing a second phase retarder film having prescribed optical characteristics between the second polarizing film and the liquid crystal cell; and moreover found that an advantageous method of producing the laminate polarizing plate; and then achieved the present invention.

One of objects of the invention is to provide a laminate polarizing plate suitable to improve viewing angle of liquid crystal displays, and available to simplify constitution and production procedures thereof, and also to reduce cost thereof. Another object of the invention is to provide an industrially advantageous method of producing the laminate polarizing plate. Further another object of the invention is to provide a liquid crystal display employing the laminate polarizing plate, especially a vertical-alignment mode liquid crystal display; the displays which being available to simplify constitution and production procedures thereof, and also to reduce cost thereof, and being excellent in viewing angle.

The present invention provides a laminate polarizing plate which is laminated with a polarizing film, an adhesive layer and a phase retarder film in this order, wherein said phase retarder film includes at least one coating layer having refractive index anisotropy of which an in-plane retardation value $R_0$ is 0 to 10 nm and a retardation value in the thickness direction R' is 40 to 300 nm, wherein said coating layer is formed on a transfer substrate, followed by transferring on a surface of the adhesive layer of the polarizing film.

The in-plane retardation value $R_0$ of phase retarder film including at least one coating layer having refractive index anisotropy, can be directly measured by the coating layer being once transferred on a glass plate. The retardation value in the thickness direction R' can be calculated from a retardation value $R_{40}$ which is measured in 40° aslant state by applying the in-plate slow axis of the phase retarder film as a inclined axis, and the in-plane retardation value $R_0$.

The laminate polarizing plate is used by being generally affixed to a liquid crystal cell at a side of the phase retarder film thereof. Therefore, a second adhesive layer may be further disposed to an outer side of the phase retarder film.

In the laminate polarizing plate, a coating layer having refractive index anisotropy may be, for example, constituted with a liquid crystalline compound or a cured liquid crystalline compound. The coating layer having refractive index anisotropy may be also constituted with a layer containing an organic modified clay composite which being able to disperse in an organic solvent. The layer containing an organic modified clay composite may include, in addition to the organic modified clay composite, a binder resin, for example, such as methacrylic resins, urethane resins and polyester resins. In this case, it is advantageous that the binder resin has a glass transition temperature of equal to or less than a room temperature. Furthermore, the coating layer having refractive index anisotropy may be constituted by a polyimide film prepared from a soluble polyimide solution, or by a layer containing a rigid chain polymer including polymers exhibiting a negative birefringent anisotropy such as a polyamide, a polyester, a poly(amide-imide) or a poly(ester-imide). The coating layer having refractive index anisotropy may be still more constituted by a multi-layered thin film alternately laminated with materials having different refractive index.

The present invention also provides an advantageous method of producing a laminate polarizing plate which laminates a phase retarder film including at least one coating layer having refractive index anisotropy, on an adhesive layer side of a polarizing film having an adhesive layer; this method includes steps of preparing the polarizing film having the adhesive layer, separately forming the coating layer on a transfer substrate, being followed by laminating the surface opposite to the transfer substrate the coating layer on the adhesive layer of the polarizing film, and then the transfer substrate being removed off from the coating layer.

The transfer substrate used in the above method is preferably subjected to a treatment of mold release on a surface which the coating layer being formed on, wherein a water contact angle of the surface subjected to the treatment of mold release is 90 to 130°. Moreover, after the transfer substrate being removed off from the coating layer, a second adhesive layer may be formed on the surface of the coating layer. When forming the second adhesive layer, it is advantageous to apply the following steps; a first step of forming the coating layer on the transfer substrate, followed by laminating an exposed surface of the coating layer on the adhesive layer of the polarizing film, and a second step of forming the second adhesive layer on a coating layer surface removed off from the transfer substrate while removing off the transfer substrate from the coating layer laminated on the polarizing film. It is advantageous in the second step that the second adhesive layer is applied under the condition that increase of a water contact angle of the coating layer surface after the transfer substrate being removed off, being set equal to or less than 15° in comparison with a water contact angle of the exposed surface when the coating layer being formed. This method enables to produce the laminate polarizing plate in high accuracy and low cost.

The present inventions also provide a liquid crystal display device comprising the laminate polarizing plate described above and a liquid crystal cell. In the display, the laminate polarizing plate is disposed to one face of the liquid crystal cell in the manner that a phase retarder film side facing toward the liquid crystal cell, that is, placing the phase retarder film to the liquid crystal cell side relative to a polarizing film. At the other side of the liquid crystal cell, a second phase retarder film of which an in-plane retardation value $R_0$ is 30 to 300 nm and a ratio $R_0/R'$ of the in-plane retardation value $R_0$ to a retardation value R' in the thickness direction is larger than 0 and less than 2, and a second polarizing film are disposed in this order; this disposition arrangement can enhance the viewing angle of liquid crystal cell.

On this liquid crystal display, a $R_0/R'$ of the second phase retarder film is preferably 0.8 to 1.4. The second polarizing film may be a conventional straight polarizer having protective layers on both sides thereof, or a straight polarizer having a protective layer on only one side thereof and laminating the second phase retarder film on the side not having the protective layer.

The laminate polarizing plate of the present invention, although the constitution thereof being simplified, can attain advantages by means of being disposed on one side of a liquid crystal cell, and on the other side of the liquid crystal cell, disposing a phase retarder film having different optical characteristic (a second phase retarder film) together with a second polarizing film; the advantages that being optical characteristics of equal to or more than those exhibited by conventional vertical-alignment mode liquid crystal displays having each one of biaxially phase retarder films independently disposed at upper and lower side. Furthermore, the laminate polarizing plate, due to the constitution thereof being simplified, contributes to make thickness of liquid crystal displays thinner and to reduce cost thereof. When the second polarizing film is constituted by a straight polarizer having a protective layer on only one side thereof and laminating the second phase retarder film on the side not having the protective layer thereof, the thickness of liquid crystal displays is allowed further thinned.

The method of producing a laminate polarizing plate of the present invention makes production processes simplified and enables production of the laminate polarizing plate which little generating phase retardation fluctuation, bubbles left in lamination, contamination with foreign substances and the like. Therefore, this method contributes improvement of yield and cost reduction on the laminate polarizing plate production.

10—Laminate polarizing plate
11—Polarizing film
12—Adhesive layer
13—Adhesive polarizing film
14—Release film of polarizing film
15—Coating layer having refractive index anisotropy (Phase retarder film)
17—Second adhesive layer
18—Release film of adhesive layer
19—Adhesive film
20—Transfer substrate
21—Transfer substrate after peeled off
25—Semi-finished product
30—Transfer substrate unrolling out roller
32—Coater
34—Coating layer drying zone
36—Polarizing film unrolling out roller
38—Release film rolling in roller
40—Semi-finished product roller
41—Semi-finished product turning roller
43—Transfer substrate peeling off roller
44—Transfer substrate rolling in roller
45—Adhesive film unrolling out roller
46—Adhesive coater
47—Adhesive drying zone
48—Peel-off film unrolling out roller
50—Product roller
60—Liquid crystal cell
62—Second phase retarder film
64—Second polarizing film

PREFERABLE EMBODIMENT OF THE INVENTION

Figure 1:
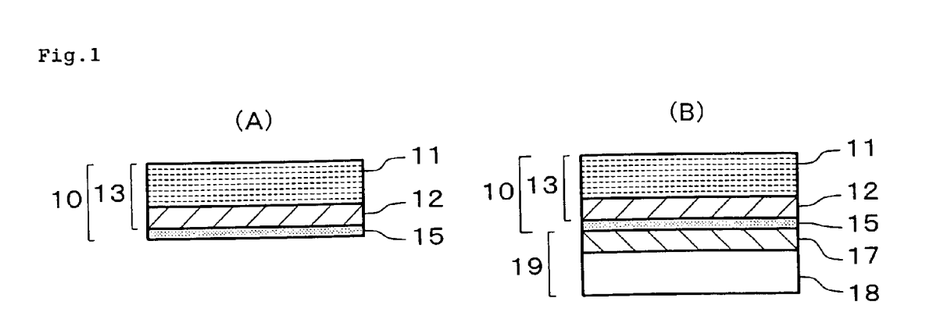
FIG. 1: A schematic sectional view representing a constitution of the laminate polarizing plate of the invention.
Figure 2:
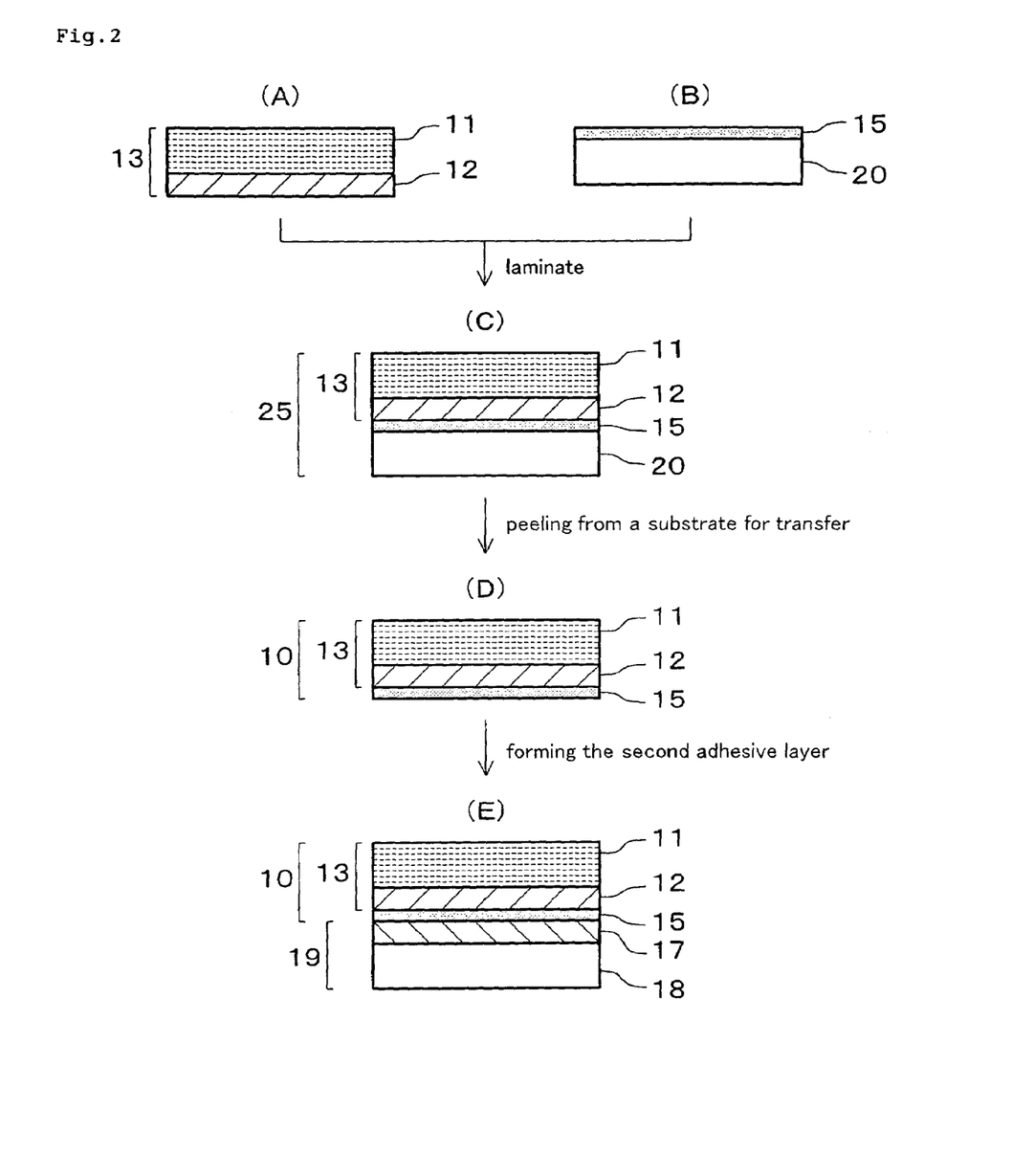
FIG. 2: A schematic sectional view exemplifying outline of a production process of the laminate polarizing plate.
Figure 3:
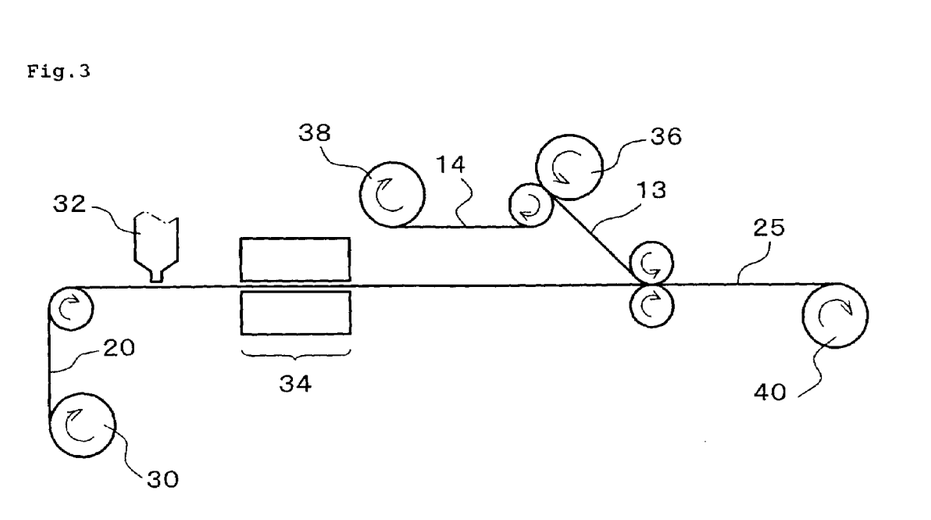
FIG. 3: A side view exemplifying outline of steps, when the laminate polarizing plate being produced in a rolled form, of from forming a coating layer having refractive index anisotropy to affixing a polarizing film coated with an adhesive.
Figure 4:
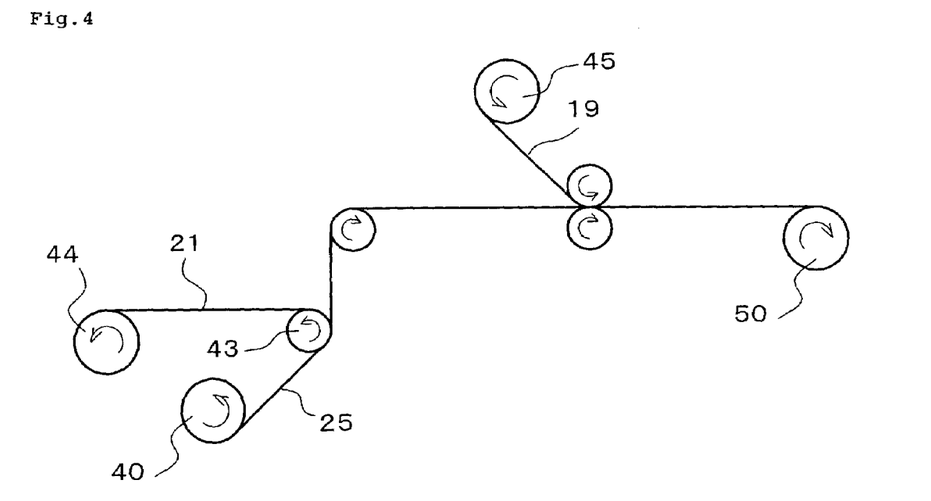
FIG. 4: A side view exemplifying outline of a step of disposing a second adhesive layer on the laminate polarizing plate.
Figure 5:
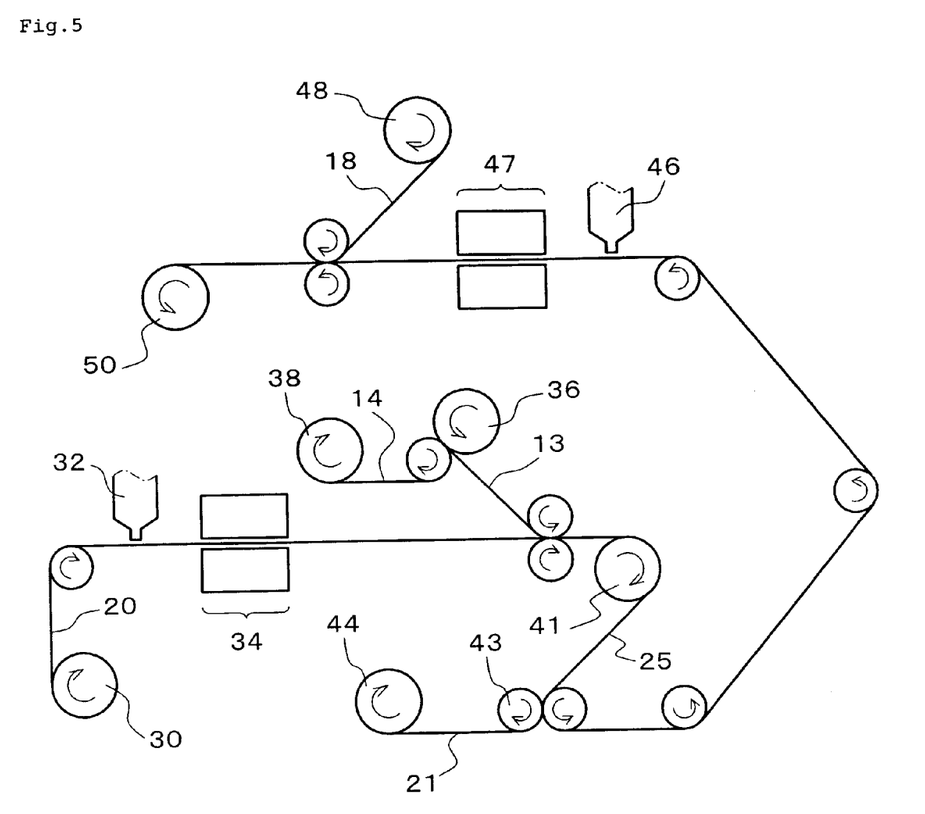
FIG. 5: A side view exemplifying outline of consecutively carrying out from a coating layer formation to a second adhesive layer formation.
Figure 6:
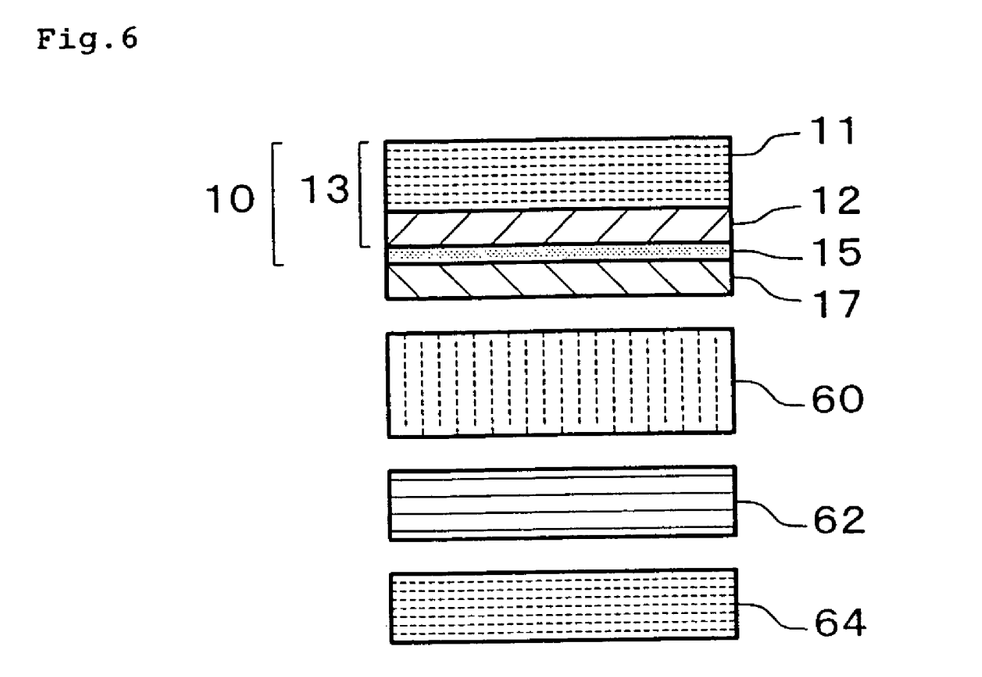
FIG. 6: A schematic sectional view representing a constitution of the liquid crystal display of the invention.
Figure 7:
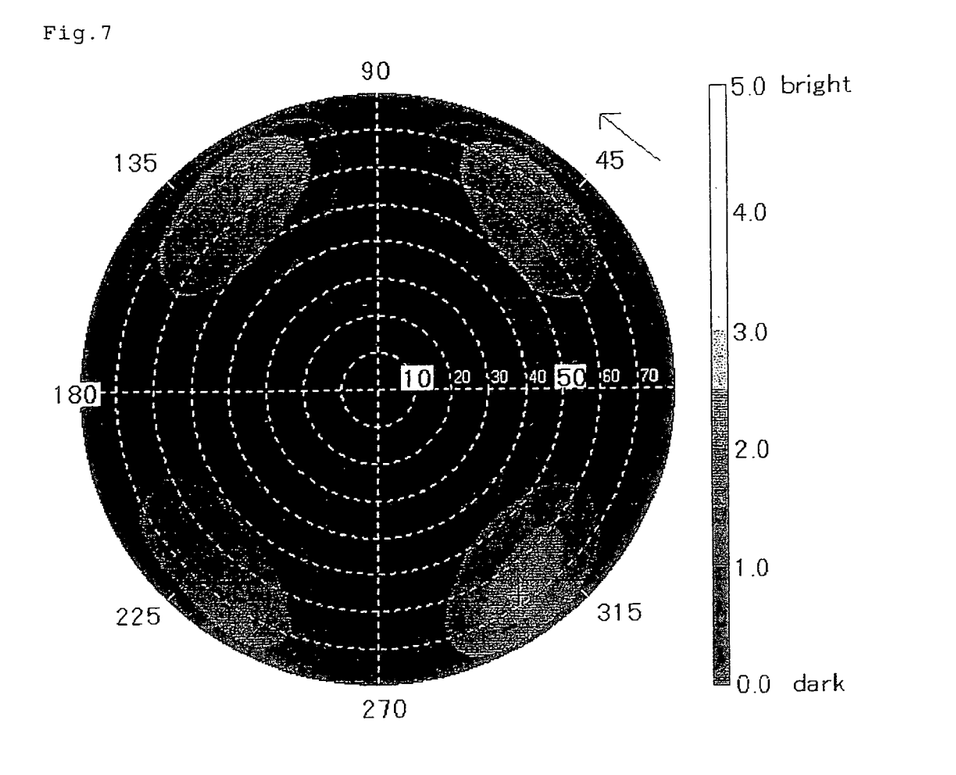
FIG. 7: A view of brightness distribution at a state without charging voltage (black indication) of the liquid crystal display produced in the Example 2.

The present invention is explained in detail as follows by appropriately referring the drawings. FIG. 1 is a schematic sectional view representing a constitution of the laminate polarizing plate of the invention. FIG. 2 is a schematic sectional view exemplifying a production process outline of the laminate polarizing plate. FIG. 3 is a side view exemplifying outline of steps, when the laminate polarizing plate being produced in a rolled form, of from a step of forming a coating layer having refractive index anisotropy to a step of adhering a polarizing film coated with an adhesive. FIG. 4 is a side view exemplifying outline of a step of forming a second adhesive layer on the laminate polarizing plate. FIG. 5 is a side view exemplifying outline of consecutively carrying out from a coating layer formation to a second adhesive layer formation. FIG. 6 is a schematic sectional view representing a constitution of the liquid crystal display of the invention. FIG. 7 is a view of brightness distribution without charging voltage (black indication) of the liquid crystal display produced in the Example 2.

By referring the FIG. 1(A), a laminate polarizing plate 10 of the present invention is laminated with a phase retarder film 15 including a coating layer having specific optical characteristics, on a polarizing film 11 interposing an adhesive layer 12. The polarizing film 11 and the adhesive layer 12 are usually prepared in a form of an adhesive polarizing film 13. The phase retarder film 15 includes the coating layer having refractive index anisotropy, and the coating layer may be constituted in one layer or a multi layer including at least two layers.

The laminate polarizing plate 10 is usually used by being affixed to a liquid crystal cell in the manner that the phase retarder film 15 being disposed at the liquid crystal cell side, to say another word, the polarizing film being disposed outer side. Therefore, to affix to the liquid crystal cell, as shown in the FIG. 1(B), a second adhesive layer 17 may be further disposed at the outer side of the phase retarder film 15. In this case, a release film 18 is disposed further outer side of second adhesive layer 17, and the release film 18 is removed by peeling off before affixation to affix the liquid crystal cell on the surface of the second adhesive layer 17. An adhesive film 19 may be also composed of the release film 18 layered by the adhesive layer 17 to be laminated, by facing the side of the adhesive layer 17 thereof toward, on the phase retarder film 15.

In the invention, the phase retarder film 15 including the coating layer is formed on a transfer substrate, followed by transferring on the surface of the adhesive layer 12 of the adhesive polarizing film 13 to complete the formation thereof. An example that forming a coating layer on the transfer substrate, followed by transferring the coated layer on the surface of the adhesive layer, is explained according to the FIG. 2.

Firstly, as shown in the FIG. 2(A), the adhesive polarizing film 13 is prepared, in which the adhesive layer 12 being formed on the surface of the polarizing film 11. Separately, as shown in the FIG. 2(B), the coating layer 15 is formed on the surface of a transfer substrate 20. Thereafter, the adhesive layer 12 of the adhesive polarizing film 13 shown in (A) is affixed to the coating layer 15 on the transfer substrate 20 shown in (B), in order to produce a semi-finished product 25 having a layered state of the polarizing film 11/the adhesive layer 12/the coating layer 15/the transfer substrate 20 as shown in the FIG. 2(C). Then, the laminate polarizing plate 16 having layers shown in the FIG. 1(A) is obtained by peeling off the transfer substrate 20 as shown in the FIG. 2(D). Furthermore, as shown in the FIG. 2(E), disposition of the second adhesive layer 17 and the release film 18 on the surface of the phase retarder film 15 including the coating layer after the transfer substrate being peeled off, allow to obtain the laminate polarizing plate 10 having the adhesive layer, as shown in the FIG. 1(B). The second adhesive layer 17 may be disposed by directly coating an adhesive on the coating layer 15, or by a way that being pre-coating an adhesive on the release film 18, followed by drying to prepare an adhesive film 19, and then by affixing the side of the adhesive layer 17 to the coating layer 15.

The polarizing film 11 may be the one having a selective transmission ability to a linearly polarized light in a specific vibration direction. Specifically, included is the one that a dichroic dye is absorbed and oriented on a base resin film such as polyvinylalcohols. Typically used dichroic dyes are iodine or dichroic organic dyes. For example, included as example of a polarizing film are a uniaxially oriented polyvinylalcohol absorbed and oriented with iodine molecules, or a uniaxially oriented polyvinylalcohol absorbed and oriented with an azo dichroic dye. The polyvinylalcohol polarizing films absorbed and oriented with those dichroic dyes, have functions of absorbing a linearly polarized light having plane of vibration in the oriented direction of the dichroic dyes, and of transmitting a linearly polarized light having orthogonal plane of vibration in the oriented direction.

Those polarizing films are usually used in the form that a protecting layer of polymer films such as a triacetylcellulose film and the like, is formed at one side or both sides of the polyvinylalcohol polarizing film. When a polarizing film has a protecting layer at only one side thereof, the polarizing film is disposed in the manner that the protecting layer being at the outer side and the side not having the protecting layer facing toward the adhesive layer 12.

The phase retarder film 15 including the coating layer is not limited as long as exhibiting a negative birefringent anisotropy in the direction of thickness, for example, the followings may be used:

a layer containing a liquid crystalline compound itself or a cured liquid crystalline compound;

a layer containing at least one organic modified clay composite able to disperse in an organic solvent as disclosed in the above described U.S. Pat. No. 6,060,183 (corresponding to JP-A No.H10-104428);

a layer including a polyimide film prepared from a soluble polyimide solution as disclosed in the above described WO94/24191 corresponding to JP-A No.H08-511812);

a layer including rigid chain polymers such as a polyamide, a polyester, a poly(amide-imide) or a poly(ester-imide) which exhibiting a negative birefringent anisotropy, as disclosed in the above described WO96/11967 corresponding to JP-A No.H10-508048); and a layer including a multi-layered thin film alternately laminated with materials having different refractive index as disclosed in the above described U.S. Pat. No. 5,196,953 (corresponding to JP-A No.H05-249457).

When a layer containing a liquid crystalline compound itself or a cured liquid crystalline compound, is employed as the coating layer, the liquid crystalline compound shall be aligned to exhibit a negative birefringent anisotropy in the direction of thickness. The aligned formation varies depending on the kind of liquid crystalline compound employed; for example, preferably applied alignments for exhibiting a negative birefringent anisotropy in the direction of thickness are, in the case of a discotic liquid crystal compound, homeotropic alignment in which disc faces oriented upward, or in the case of a rod-like nematic liquid crystal compound, super twisted alignment of equal to or more than 270°. Methods of aligning a liquid crystalline compound is not limited, conventional ones can be applicable such as employing oriented films, rubbing, addition of chiral dopant and light radiation and the like. Furthermore, after a liquid crystalline compound being aligned, the liquid crystalline compound may be cured to fix the alignment, or leave liquid crystallinity thereof to retain functions such as temperature compensation and the like.

When a layer containing at least one organic modified clay composite able to disperse in an organic solvent as described above, is employed as the coating layer, if the transfer substrate 20 applied to form a film is a flat plate, a unit crystalline layer of the organic modified clay composite aligns its laminar structure parallel to the surface of the flat plate and random in its own plane. Consequently, the layer, without specific alignment treatment, exhibits a refractive index structure that the in-plane refractive index is larger than the refractive index of the thickness direction.

The organic modified clay composite, as described, is a composite of an organic compound and a clay mineral, more specifically, for example, a combined substance of a clay mineral having laminar structure and an organic compound. The clay minerals having laminar structure includes a smectite group or a swellable mica, of which positive ion exchangeability enables to combine with organic compounds. Among of them, the smectite group is preferably employed due to its excellent transparency. Examples belonging to the smectite group are hectorite, montmorillonite, bentonite and the like, substituteds thereof, derivatives thereof and mixtures thereof. Among those, the synthesized is preferable due to little contamination with impurities and excellent transparency. The synthetic hectorite whose particle diameter is controlled to be small, is particularly preferably used due to its ability to suppress scattering of visible lights.

The organic compounds combined with clay minerals include a compound able to react with oxygen atoms and hydroxyl groups of the clay mineral or an ionic compound able to exchange with exchangeable cations; which are not particularly limited as long as the resultant organic modified clay composite can be swelled or dispersed in an organic solvent, specifically included are nitrogen-containing compounds and the like. The nitrogen-containing compound includes, for example, a primary, a secondary or a tertiary amine, a quaternary ammonium compound, urea, hydrazine, and the like. Among of them, the quaternary ammonium compound is preferable due to its ability to easily exchange cations.

The organic modified clay composites may be used by combining two or more kinds thereof. Suitable commercialized organic modified clay composite includes the composite compound of synthetic hectorite and a quaternary ammonium compound manufactured by CO-OP Chemical CO., LTD. in the trade name of Lucentite STN or Lucentite SPN.

The organic modified clay composites is preferably used in combination with a resin as binder from the view points of easiness of forming coating layer on a transfer substrate, expressing ability of optical characteristics, mechanical properties and the like. The binders used with the organic modified clay composites is preferably the one soluble to organic solvents such as toluene, xylene, acetone, ethylacetate and the like, particularly preferably the one of which glass transition temperature being equal to or less than a room temperature. The binders having hydrophobic property are also preferable to obtain well moisture and temperature resistance and well handling ability which being required when the compound polarizing plate is applied to large size liquid crystal displays of more than 15 inches (381 mm) in width across corner. Those preferable binders include polyvinylacetal resins such as polyvinylbutyral and polyvinylformal; cellulose resins such as cellulose acetate butyrate; acrylic resins such as butylacrylate; methacrylic resins, urethane resins, epoxy resins, polyester resins and the like. Among of them, the acrylic resins are particularly preferably applied. Those resins may be a polymerized resin, or polymerized with monomers or oligomers thereof by heat or ultraviolet light in film processing procedure. Furthermore, the plural thereof may be used in mixture.

Commercialized resins used as suitable binder include an aldehyde-modified polyvinylalcohl resin manufactured by DENKA Co., Ltd. in the trade name of Denka Butyral #3000-K, acrylic resin manufactured by TOAGOSEI Co., Ltd. in the trade name of Aron S1601, urethane resin based on isophoronediisocyanate manufactured by SUMIKA BAYER URETHANE Co., Ltd. in the trade name of SBU lacquer 0866, and the like.

A ratio of the organic modified clay composite dispersible to organic solvents to the binder, is preferably in a range of from 1:2 to 10:1 in terms of the weight ratio of the former (the organic modified clay composite): the latter the binder, from the viewpoint of improving mechanical characteristics such as prevention of fracture of a layer including the organic modified clay composite and the binder. The organic modified clay composite is coated on the transfer substrate in a state dispersed in an organic solvent. When a binder being used simultaneously, the binder is also dispersed and dissolved together in the organic solvent. A concentration of solid in the dispersed solution is not limited as long as gellation or turbidity of the prepared dispersed solution is occurred to the extent not causing troubles in practical usage; usually applied range is 3 to 15% by weight in terms of the total of the solid concentration of the organic modified clay composite and the binder. Since the optimal solid concentration varies depending on the kind or the composition ratio of organic modified clay composites or binders employed respectively, it is determined on each case of the composition. Various additives such as a viscosity adjustor for improving layer formability in case of forming a layer on a transfer substrate, a crosslinking agent for further improving the hydrophobic nature and/or durability, and the like, may also be added.

As the coating layer, it is also possible to apply the layer including a polyimide film prepared from a soluble polyimide solution as disclosed in WO 94/24191, or the layer including rigid chain polymers such as a polyamide, a polyester, a poly(amide-imide) or a poly(ester-imide) which exhibiting a negative birefringent anisotropy as disclosed in WO 96/11967. Those soluble polymers exhibit a negative birefringent anisotropy due to the main chain thereof being aligned parallel to the surface of release film through self-aligning process when being cast on a transfer substrate, and the degree of refractive index anisotropicity can be also adjusted by changing linearity or rigidity of the main chain thereof besides by changing thickness of the coating layer.

When a layer including a multi-layered thin film alternately laminated with materials having different refractive index as disclosed in U.S. Pat. No. 5,196,953, is employed as the coating layer, thickness and refractive index of each layer is designed to obtain required negative birefringent anisotropy according to the disclosure therein.

The thickness of the coating layer is not particularly limited, may be in the range that the in-plane retardation value $R_0$ is 0 to 10 nm and the retardation value in the thickness direction R' is 40 to 300 nm. It is not preferable that the in-plane retardation value $R_0$ exceeds 10 nm, because the exceeded value is not neglectable and deteriorates a negative uniaxiality in the thickness direction. Since the refractive index anisotropy in the thickness direction which is necessary for the phase retarder film 15 constituting the laminate polarizing plate 10, varies depending on the case of usage, the retardation value in the thickness direction R' is appropriately selected from a range of 40 to 300 nm according to the objected application thereof, especially to the characteristics of a liquid crystal cell. The retardation value in the thickness direction R' is advantageously about 50 to 200 nm.

The refractive index anisotropy in the thickness direction is represented by the retardation value in the thickness direction R' which being defined by the formula (II) described above; and can be calculated from a retardation value $R_{40}$ which is measured in 40° inclined state by applying the in-plate slow axis as an inclined axis, and the in-plane retardation value $R_0$.

The retardation value in the thickness direction R' defined by the formula (II) can be calculated as follows; using the in-plane retardation value $R_0$, the retardation value $R_{40}$ measured in 40° inclined state by applying the in-plate slow axis as an inclined axis, the film thickness d and the average refractive index of film $n_0$, the $n_x$, $n_y$ and $n_z$ are obtained from the following formulas by numerical computation, and the results of the numerical computation are substituted in the aforementioned formula (II).

$$R_0=(n_x-n_y)\times d \quad \text{(III)}$$

$$R_{40}=(n_x-n_y')\times d/\cos(f) \quad \text{(IV)}$$

$$(n_x+n_y+n_z)/3=n_0 \quad \text{(V)}$$

wherein $$f=\sin^{-1}[\sin(40°)/n_0]$$

$$n_y'=n_y\times n_z/[n_y^2\times\sin^2(f)+n_z^2\times\cos^2(f)]^{1/2}$$

If at least one coating layer having refractive index anisotropy which being formed on a transfer substrate, is once transferred on a glass plate by being interposed with an adhesive, the $R_0$ and $R_{40}$ of the coating layer (a phase retarder film) can be directly obtained; consequently, according to the results obtained, the retardation value in the thickness direction R' can be calculated by the above procedure.

A method of producing a compound polarizing plate of the present invention is explained. As afore-explained by referring to the FIG. 2, the invention employs a method that a coating layer 15 having refractive index anisotropy is formed on a transfer substrate 20, and then the resultant is transferred to an adhesive layer 12 on a polarizing film 11. Since the method employed does not need to carry out a procedure of drying the coating layer on the polarizing film, it allows to avoid the polarizer from the deterioration due to heat and the coating layer from the defects due to lack of drying, and to advantageously produce the compound polarizing plate.

A transfer substrate 20 is a pre-treated film to easily peel off a layer formed on the surface thereof; the film is commercially available, generally, such as resin films of polyethylene terephthalate and the like of which surface is processed with treatment of mould release by coating mould release such as a silicone resin, a fluoric resin and the like. In order to form the coating layer 15 on the transfer substrate 20, a water contact angle of the transfer substrate 20 is preferably 90 to 130°, the water contact angle is further preferably equal to or more than 100° or equal to or less than 120°. If the water contact angle is less than 90°, the peel-off ability of the transfer substrate 20 is not sufficient, tending to cause defects such as phase retardation irregularity and the like in the phase retarder film including the coating layer 15. If the water contact angle is more than 130°, an un-dried coating solution on the transfer substrate 20 often exhibits repelling property, resulting in-plane phase retardation irregularity. The water contact angle mentioned here means a contact angle with a water used as liquid, and means that the larger the angle (upper limit value being 180°) is, the less wetting ability is.

As also afore-explained by referring to the FIG. 2, especially (E) thereof, a second adhesive layer 17 may be disposed at the outer side of the phase retarder film 15 including the coating layer. When disposing the second adhesive layer 17, it is advantageous to apply the following steps; a first step of forming the coating layer 15 on the transfer substrate 20, followed by laminating an exposed surface of the coating layer 15 on the adhesive layer 12 of the polarizing film 11, and a second step of forming the second adhesive layer 17 on a surface of the coating layer 15 removed off from the transfer substrate while removing off the transfer substrate 20 from the coating layer 15 laminated on the polarizing film. When the compound polarizing plate is produced in a rolled form, an outline of the first step described above is exemplified by a side view in the FIG. 3, and an outline of the second step described above is exemplified by a side view in the FIG. 4, In the first step, the coating layer having refractive index anisotropy is formed on the transfer substrate, followed by affixing the adhesive layer of the polarizing film on a surface exposed to air of the formed coating layer and then being rolled in. This step is explained in more detail by referring to the FIG. 3; a surface of the transfer substrate 20 which is unrolled out from a transfer substrate unrolling out roller 30, is coated with a coating solution for the coating layer by a coater 32, followed by drying through a drying zone 34, and then being subjected to affixation with an adhesive polarizing film 13. Since the adhesive polarizing film 13 is usually supplied in the form that a peelable release film is pre-affixed on the surface of the adhesive layer, a release film 14 is at first peeled off from the adhesive polarizing film 13 which is unrolled out from a polarizing film unrolling out roller 36, followed by rolling in to a release film rolling in roller 38. Then, a surface exposing the adhesive layer of the adhesive polarizing film 13 is affixed on the surface of the coating layer formed on the transfer substrate described above, resulting a semi-finished product 25 constituted by layers of the polarizing film/the adhesive layer/the coating layer/the transfer substrate, and then being rolled in a semi-finished product roller 40.

The first step has advantages compared to conventional methods; the conventional methods that a surface exposed to air of a coating layer is affixed by a protecting film, followed by being rolled in, then the rolled affixed film is unrolled out, followed by affixing with a polarizing film along with peeling off the protecting film; the advantages that being reduction of processing steps, elimination of defect derived from incomplete peeling off leaving pieces of respective films on each other's surface, elimination of foreign substance caused by the protecting film, thus the advantages allow to obtain the semi-finished product 25 in quite excellent qualities. Moreover, the applying a side tape is also an advantageous technology; the tape which being employed to inhibit the surfaces of the semi-finished product from contacting each other, for the purpose to avoid migration of mould release of the transfer substrate 20 to the coating layer due to the pressure provided when the semi-finished product being rolled in.

The coating method employed in the first step to form the coating layer is not particularly limited, various known coating methods can be employed such as direct gravure method, reverse gravure method, die coating method, comma coating method, bar coating method and the like.

The second step following to the first step, while the transfer substrate being peeled off from the semi-finished product obtained in the first step, forms an adhesive layer on the surface of the coating layer after peeled off, that is, gives an adhesive processing. The step is explained in more detail referring to the FIG. 4; the semi-finished product 25 once rolled in the semi-finished product roller 40 in the first step shown in the FIG. 3, is again unrolled out from the same roller 40, followed by peeling off a transfer substrate 21 by a transfer substrate peeling off roller 43; and then a surface of the coating layer exposed by the peeling off is supplied with an adhesive film 19 unrolled out from a roller 45 in the manner that the side of the adhesive layer thereof facing toward the coating layer, followed by affixing the coating layer and the adhesive film each other, and then rolling in a product roller 50. The transfer substrate peeled off from the semi-finished product 25 is rolled in a transfer substrate rolling in roller 44. Although the figure shows a case that the adhesive coated film 19 is used to form the second adhesive layer, as aforementioned, the adhesive may be directly coated on the coating layer. By being processed through these steps, the laminate polarizing plate is obtained which is arranged in the order of the polarizing film/the adhesive layer/the coating layer/the adhesive layer.

The step 1 shown in the FIG. 3 and the step 2 shown in the FIG. 4 may be consecutively connected. The example of this case is shown in the FIG. 5 as a schematic side view. In the FIG. 5, parts corresponding to the part exhibited in the FIGS. 3 and 4 are represented by the same signs used therein, and detail explanations thereabout are omitted. In this example, the surface of the transfer substrate 20 unrolled out from the transfer substrate unrolling out roller 30, is coated with a coating solution for the coating layer by the coater 32, followed by passing through the drying zone 34 to be dried, and then the resultant coated side thereof is affixed to the adhesive layer side of the adhesive polarizing film 13 which being unrolled out from the polarizing film unrolling out roller 36 and then being peeled off the release film 14; consequently, the semi-finished product 25 having a layer constitution including the polarizing film/the adhesive layer/the coating layer/the adhesive layer, is obtained. The procedures described here are same to that of the step 1 shown in the FIG. 3.

After the above procedures, the semi-finished product is passed through a semi-finished product turning roller 41 without being rolled in, followed by peeling off the transfer substrate by a transfer substrate peeling off roller 43 to roll the peeled-off transfer substrate 21 on a rolling in roller 44. On the other hand, a surface of the coating layer after peeled off the transfer substrate 21, is coated with an adhesive by an adhesive coater 46, followed by drying by passing through a drying zone 47, and then the resultant coated surface is affixed with a release film 18 unrolled out from a release film roller 48, followed by being rolled in a product roller 50. Althouth, in this example, in order to form the second adhesive layer, a direct coating-drying method employing the adhesive coater 46 and the drying zone 47 is exhibited, the method of applying the adhesive film as shown in the FIG. 4 may be employed.

If the coating layer 15 is left for long time under contacting with the transfer substrate 20, the mould release on the transfer substrate 20 often migrates to the coating layer 15, resulting increase of a water contact angle of the surface of the coating layer 15 after peeling off the transfer substrate 20 (or 21 in case after peeled off). From the view point of adhesive ability between the surface of the coating layer 15 after peeling off the transfer substrate 21 and the second adhesive layer 17; it is preferable that the peeling-off and adhesive-coating processing to the transfer substrate in the second step 2 is carried out under a condition; the condition that an increase of the water contact angle of the surface of the coating layer 15 after peeling off the transfer substrate, is equal to or less than 15°, preferably equal to or less than 10° in comparison with the contact angle of the air exposed surface of the coating layer 15 when the coating layer 15 is formed on the transfer substrate 20 (refer to the FIG. 2(B)). For this purpose, it is preferable to shift to the step 2 as soon as possible after finishing the step 1. Furthermore, when the adhesive processing being carried out to the coating layer 15 after peeling off the transfer substrate 21, it is also an advantageous technology to apply a corona treatment on a surface of either the coating layer 15 or the second adhesive layer 17.

In the FIG. 3 to 5, curled arrows indicate a direction of rotation of rollers.

The adhesive used for the adhesive layer 12 formed on the surface of the polarizing film 11 shown in the FIGS. 1 and 2, or for the second adhesive layer 17 formed on the coating layer 15 in the step 2, includes the one having base polymers such as acrylic resins, silicone resins, polyesters, polyurethanes, polyethers and the like. Of those, the preferably applied is the one selected from the adhesives, like acrylic resin adhesives, having properties of excellent optical transparency, retaining appropriate wettability and cohesive power, excellent adhesive ability to substrate, weather and temperature resistances, not causing exfoliation problems such as floating up, peeling off or the like under heated or humid conditions. In the acrylic resin adhesives, the useful base polymer is an acrylic copolymer resin having a weight average molecular weight of equal to or more than 100 thousand which being polymerized by blending methacrylic acid alkyl esters and acrylic monomers containing a functional group to make the glass transition temperature of the resultant copolymer being preferably equal to or less than 25° C., more preferably equal to or less than 0° C.; the methacrylic acid alkyl esters which having an alkyl group having carbon atoms of equal to or less than 20 such as a methyl group, an ethyl group, a butyl group and the like; and the acrylic monomers containing functional group which including a methacrylic acid, a methacrylic acid hydroxylethyl and the like. Each of thickness of the adhesive layers 12 and 17 is usually respectively about 15 to 30 μm.

The release film 18 which being shown in the FIGS. 1 and 2, and being tentatively affixed on the surface of the second adhesive layer 17, may be a film subjected to treatment of mould release on the surface thereof as well as the aforementioned transfer substrate 20, for example, a polyethylene terephthalate.

The liquid crystal display of the present invention is explained. The liquid crystal display of the invention, of which constitution example being shown in a schematic sectional view of the FIG. 6, disposes on one side of a liquid crystal cell 60 the laminate polarizing plate 10 explained above by facing the side of the phase retarder film 15 thereof toward the cell, usually being interposed by the second adhesive layer 17; and disposes on the other side of the liquid crystal cell 60 a second phase retarder film 62 and a second polarizing film 64 in this order. The second phase retarder film 62 disposed between the liquid crystal cell 60 and the second polarizing film 64, is constituted by the one of which an in-plane retardation value $R_0$ is 30 to 300 nm and a ratio $R_0/R'$ of the in-plane retardation value $R_0$ to a retardation value in the thickness direction R' is larger than 0 and less than 2, that is, $0<R_0/R'<2$. The combination of the phase retarder film having such refractive index anisotropy characteristics with the above described compound polarizing plate of the invention, allows to improve viewing angle characteristics of liquid crystal display devices. The phase retarder film giving such refractive index anisotropy characteristics may be, for example, produced by a method of subjecting a primary film to polymer to fixed-end uniaxial orientation, specifically fixed-end transversal uniaxial orientation by applying a tenter and the like. The $R_0/R'$ of the second phase retarder film 62 is preferably in a range of 0.8 to 1.4 due to the film being easily produced by the fixed-end uniaxial orientation method and well optical property obtained when being applied to liquid crystal display devices. The $R_0/R'$ may be equal to or less than 1.3.

Materials applied to the second phase retarder film 62 is not particularly limited, for example, may include a polycarbonate, a polyurethane, cyclicolefin resins such as a norbornene composed with poly-cyclicolefins as monomer thereof, celluloses, polyolefins, coplymers applying at least two monomers constituting these polymers, and the like. From the view point of optical stability under high temperature and humidity conditions, or tensioned state, preferable is the cyclicolefin resins having small photoelastic coefficient. In the second phase retarder film 62, wave length dependency of phase retardation value is also not particularly limited; from the view point of suppression of apparent coloration, preferable is the one having a phase retardation distribution in which phase retardation value decreases along with shifting to short wave length side.

The second polarizing film 64, as well as the polarizing film 11 afore-explained by referring to the FIG. 1, may be the one that a protecting layer of a polymer film is formed on one or both sides of a polyvinylalcohol polarizer having an absorbed and oriented dichroic dye. It is preferable to dispose the protecting layer to be present at least at the exposed surface of the second polarizing film 64 (the underside thereof in the FIG. 6). Alternatively, the second phase retarder film 62 may be directly adhered or adhered with using an adhesive to the second polarizing film 64 in place of using the protecting layer protecting one side of the second polarizing film 64. In this case, the second polarizing film 64 has the protecting layer only at one side of the linear polarizer and is laminated with the second phase retarder film 62 at the side not having the protecting layer thereof.

The second polarizing film 64 and the second phase retarder film 62 may be aligned in the manner that an absorption axis of the former crosses the slow axis of the latter in a range of 80 to 100°, preferably the axis angle between them being 85 to 95° from the view points of high contrast ratio and reduction of color irregularity. Still more preferably, the axis angle between them is set in a range 89 to 91°.

Furthermore, although a figure being abbreviated, an adhesives such as acrylic resins and the like may be applied to affix the liquid crystal cell 60 and the second phase retarder film 62. The adhesives such as acrylic resins and the like may be also applied to affix the second phase retarder film 62 and the second polarizing film 64, especially when the second polarizing film 64 having the protecting layers on both sides thereof. The acrylic resin adhesives are same to the afore-explained.

When the liquid crystal display device shown in the FIG. 6 is used as transmissive type, a backlight is disposed either at the outer side of the compound polarizing plate 10 thereof or at the outer side of the second polarizing film 64 thereof. The backlight may be disposed either side. Therefore, a first embodiment of the liquid crystal display device disposes the laminate polarizing plate 10 of the invention at the front side of the liquid crystal cell 60 (the visible side), and the second phase retarder film 62 and the second polarizing film 64 at the rear side (the backlight side in the case of the transmissive type). A second embodiment of the liquid crystal display device disposes the laminate polarizing plate 10 at the rear side of the liquid crystal cell 60, and the second phase retarder film 62 and the second polarizing film 64 at the front side. In these disposition arrangements, axis angles of each layer are adjusted to have optimal viewing angle.

EXAMPLE

The present invention is explained in more detail with reference to the Examples, but the present invention is not limited to the Examples. In the Examples, the term of % representing contained amount or used amount is based on weight as far as without particular remarks. The materials used for forming coating layers in the Examples are as follows.

(A) Organic Modified Clay Composite

Trade name "Lucentite STN" manufactured by CO-OP Chemical CO., LTD., which being the composite of the synthetic hectorite and the quaternary ammonium compound, and superior in dispersiblity to a high polar solvent Trade name "Lucentite SPN": manufactured by CO-OP Chemical CO., LTD., which being the composite of the synthetic hectorite and the quaternary ammonium compound, and superior in dispersiblity to a non-polar solvent (B) Binder Trade name "Arontack S1601" manufactured by TOAG-OSEI Co., Ltd, Acrylic resin varnish Measurement and evaluation of the physical properties were carried out according to the following methods.

(1) In-plane Retardation Value $R_0$

The coating layer formed on the transfer substrate was transferred to the glass plate of 4 cm.square interposing the adhesive. The measurement was carried out in the state affixed on the glass plate by "KOBRA-21 ADH" manufactured by Oji Scientific Instruments about the in-plane retardation value $R_0$ with the rotary analyzer method using monochromatic light of 559 nm wave length. The in-plane retardation value $R_0$ of the phase retarder film made of an elongated resin film was directly measured by "KOBRA-21 ADH" described above.

(2) Retardation Value in the Thickness Direction R'

By using the in-plane retardation value $R_0$, the retardation value $R_{40}$ measured in 40° aslant state by applying the in-plate slow axis as the inclined axis, the film thickness d and the average refractive index of film $n_0$, the $n_x$, $n_y$ and $n_z$ were obtained from the aforementioned method, followed by calculation of the retardation value in the thickness direction R' according to the formula (II) described above.

Example 1

The coating solution which contained 10.2% of the acrylic resin varnish "Arontack S1601", 6.75% of the organic modified clay composite "Lucentite STN", 2.25% of the organic modified clay composite "Lucentite SPN", 45.6% of toluene and 35.2% of acetone, was prepared. The prepared coating solution was consecutively coated by a die coater on the polyethylene terephthalate film of 38 μm thickness which being subjected to treatment of mould release (the water contact angle at the face subjected to the method of mould release was 110°), followed by passing through a drying oven to be dried, then the coated film was at just passed out from the oven consecutively affixed on the exposed surface thereof with the adhesive side of the polarizing film (trade name of "SUMIKARAN SRW842A", manufactured by Sumitomo Chemical) which was a polyvinylalcohol-iodine polarizer having protecting layers on both sides thereof and being provided with an adhesive layer at one side thereof; and then the affixed film was rolled in a roll to produce a semi-finished product constituting layers of the polarizing film/the adhesive layer/the coating layer/the release film. Sample of the coated film taken out before affixation with the polarizing film was measured, the results of measurement about the phase retardation value of the coating layer being $R_0$=0 nm and R'=85 nm, and about the water contact angle at the air exposed surface being 81°. Thereafter, the semi-finished product was unrolled out, followed by, while peeling off the release film, consecutive affixation on the surface of the coating layer after peeling off the release film, with the adhesive side of the polyethylene terephthalate film which being separately coated with an adhesive on mould release treatment surface thereof, to obtain a finished product constituting layers of the polarizing film/the adhesive layer/the coating layer/the adhesive layer/the release film. The water contact angle of the surface of the coating layer after peeling off the peel-off film from the semi-finished product was 88°.

100 sheets of the laminate polarizing plate having 19 inches (382 mm×307 mm) of width across corner were cut out from the product for inspection. Consequently, the high quality laminate polarizing plate in which almost no defect such as phase retardation irregularities, air bubbles left in affixed parts or the like being observed, was easily obtained in 93% yield.

Comparative Example 1

The same coating solution used in the Example 1 was consecutively coated by a die coater under the same conditions applied in the Example 1 on the polyethylene terephthalate film of 38 μm thickness which being subjected to mould releasing treatment of mould release, followed by passing through a drying oven to be dried; then the coated film was at just passed out from the oven affixed on the exposed surface thereof with the protective film, followed by being rolled in. Then, the laminated sheet constituting layers of the release film/the coating layer/the protecting film, was cut in the size of 19 inches (382 mm×307 mm) of width across corner, and then, after peeling off the protecting film, was affixed with the same adhesive polarizing film used in the Example 1 which being separately cut in the same shape, by means of a large scale affixing device to face each other's surface of the coating layer and the adhesive layer. 100 affixed sheets were prepared; 55 sheet of them were well products, but 45 sheets generated phase retardation irregularities, air bubbles left in affixed parts, spotted foreign materials, linear foreign materials and the like. Although much labor was consumed for preparation, the resultant quality was lower than that of the Example 1.

Example 2

The laminate polarizing plate produced in the Example 1 was peeled off from the release film, followed by lamination on the upper face of the VA type liquid crystal cell (a commercial product) by interposing the adhesive layer thereof; and then the lower face of the liquid crystal cell was laminated by interposing an adhesive layer with the second phase retarder film which being composed by an elongated film of a cyclicpolyolefin and having the in-plane retardation value $R_0$=100 nm and the retardation value in the thickness direction R'=130 nm, and then the lower surface of the laminated layer was further laminated by interposing an adhesive layer with the second polarizing film (trade name of "SUMIKA-RAN SQ0642A", manufactured by Sumitomo Chemical) which was a polyvinylalcohol-iodine polarizer having a protecting layer on one side thereof, in the manner that the lowest layer of the lower face being the protecting layer of the second polarizing film. In this lamination, the angle formed by absorption axes of the compound polarizing plate and the second polarizing film, was adjusted to 90°; and the angle formed by absorption axes of the second polarizing film and the slow axis of the second phase retarder film, was adjusted to 90°.

Of the liquid crystal display device, the viewing angle without charging voltage (black indication) was measured by the viewing angle dependent brightness meter "EZ-Contrast" manufactured by ELDIM. The measurement results are shown in the FIG. 7. The FIG. 7 represents the brightness distribution in this state, where the azimuth angle is represented by letting 0° in a right direction facing the picture and positive in an anti-clockwise direction (of which values being written by each 45° from 45° to 315°) and the numbers of from ⌈10⌋, ⌈20⌋ - - - ⌈70⌋ written in the transverse axis mean inclined angles from the normal line of the respective azimuth angles. For example, the right end of the circle represents a brightness at the azimuth angle of 0° in inclined direction of 80°. The gray scale located in right side represents brightness and means that the deeper (more black) the color is, the darker (less light leakage) is, and the paler (more white) the color is, the brighter (larger light leakage) is. The + mark represents the brightest (the largest light leakage) position. As understood from the Figure, the display screen viewed from front direction and inclined direction was dark and the viewing angle thereof was well.

The laminate polarizing plate of the present invention can be effectively applied to improve viewing angle of liquid crystal display devices of various modes such as vertical alignments (VA), twisted nematics (TN), optically compensated birefringents (OCB) and the like.

What is claimed is:

1. A laminate polarizing plate comprising a polarizing film, an adhesive layer and a phase retarder film which are laminated in this order, wherein said phase retarder film comprises at least one coating layer having refractive index anisotropy of which an in-plane retardation value ($R_0$) is 0 to 10 nm and a retardation value in the thickness direction (R') is 40 to 300 nm, wherein said coating layer is formed on a transfer substrate, followed by being transferred on a surface of the adhesive layer of the polarizing film, and wherein at least one layer of the coating layers having refractive index anisotropy comprises a layer containing (i) as a binder a resin whose glass transition temperature is equal to or less than a room temperature and (ii) an organic modified clay composite which is able to disperse in an organic solvent.

2. The laminate polarizing plate according to claim 1, wherein a second adhesive layer is further formed on an outer side of the phase retarder film.

3. A liquid crystal display comprising:
   a liquid crystal cell;
   a laminate polarizing plate according to claim 1, disposed at one side of said liquid crystal cell in the manner that placing a phase retarder film to the liquid crystal cell side relative to a polarizing film;
   a second phase retarder film disposed at the other side of the liquid crystal cell, wherein an in-plane retardation value ($R_0$) thereof is 30 to 300 nm and a ratio ($R_0$/R') of the in-plane retardation value ($R_0$) to a retardation value in the thickness direction thereof (R') is larger than 0 and less than 2; and
   a second polarizing film disposed at an non-facing side of said second phase retarder film facing toward the liquid crystal cell.

4. The liquid crystal display according to claim 3, wherein a $R_0$/R' of the second phase retarder film is 0.8 to 1.4.

5. The liquid crystal display according to claim 3 or 4, wherein the second polarizing film comprising a straight polarizer having a protective layer only one side thereof, wherein the side not having the protective layer thereof is laminated with the second phase retarder film.

* * * * *